(12) United States Patent
Yoon

(10) Patent No.: US 10,846,909 B2
(45) Date of Patent: Nov. 24, 2020

(54) PORTABLE RAY TRACING APPARATUS

(71) Applicant: SILICONARTS, INC., Seoul (KR)

(72) Inventor: Hyung Min Yoon, Seoul (KR)

(73) Assignee: SILICONARTS, INC., Seoul (KR)

( * ) Notice: Subject to any disclaimer, the term of this patent is extended or adjusted under 35 U.S.C. 154(b) by 0 days.

(21) Appl. No.: 16/427,588

(22) Filed: May 31, 2019

(65) Prior Publication Data
US 2020/0327716 A1 Oct. 15, 2020

(30) Foreign Application Priority Data
Apr. 11, 2019 (KR) .......................... 10-2019-0042387

(51) Int. Cl.
*G06T 15/06* (2011.01)
*G06F 13/12* (2006.01)
*G06T 15/80* (2011.01)
*G06F 9/50* (2006.01)
*G06F 13/38* (2006.01)

(52) U.S. Cl.
CPC ............ *G06T 15/06* (2013.01); *G06F 9/5016* (2013.01); *G06F 9/5044* (2013.01); *G06F 13/122* (2013.01); *G06F 13/385* (2013.01); *G06T 15/80* (2013.01); *G06T 2200/28* (2013.01); *G06T 2210/36* (2013.01); *G06T 2210/52* (2013.01)

(58) Field of Classification Search
CPC ..... G06T 15/06; G06T 15/80; G06T 2210/52; G06T 2210/36; G06F 9/5016
See application file for complete search history.

(56) References Cited

U.S. PATENT DOCUMENTS

| | | | |
|---|---|---|---|
| 8,836,702 B2 * | 9/2014 | Yoon | G06T 15/06 345/419 |
| 9,311,739 B2 * | 4/2016 | Hur | G06T 15/06 |
| 2015/0062164 A1 * | 3/2015 | Kobayashi | G06T 19/006 345/633 |
| 2016/0314611 A1 * | 10/2016 | Shin | G06T 15/06 |
| 2017/0024924 A1 * | 1/2017 | Wald | G06T 15/005 |
| 2019/0122419 A1 * | 4/2019 | Peterson | G06T 15/80 |

FOREIGN PATENT DOCUMENTS

| KR | 10-2014-0023615 A | 2/2014 |
|---|---|---|
| KR | 10-1560283 B1 | 10/2015 |

OTHER PUBLICATIONS

Lee et al., Real-Time Ray Tracing on Future Mobile Computing Platform, Nov. 19-22, 2013; SIGGRAPH Asia 2013, Nov. 19-22, 2013, Hong Kong, Copyright © ACM 978-1-4503-2511-0/13/11, pp. 1-5 (Year: 2013).*

* cited by examiner

*Primary Examiner* — Samantha (Yuehan) Wang
(74) *Attorney, Agent, or Firm* — Paratus Law Group, PLLC

(57) ABSTRACT

Disclosed is a portable ray tracing apparatus. The apparatus includes: a physical connection unit providing a physical connection to a connection port of a user terminal; a graphic data area detecting unit detecting a graphic data area which is allocated to a system memory of the user terminal if the physical connection is provided and which employs an acceleration structure for graphics processes agreed upon in advance; and a graphic processor operating unit synchronizing the graphic data area with an internal memory and operating a graphic processor of the user terminal. Therefore, the present invention performs ray tracing by being physically connected to a computing device and thereby shares graphics processing.

8 Claims, 8 Drawing Sheets

PORTABLE RAY TRACING APPARATUS

CROSS-REFERENCE TO PRIOR APPLICATION

This application claims priority to Korean Patent Application No. 10-2019-0042387, filed on Apr. 11, 2019, which is hereby incorporated by reference in its entirety.

BACKGROUND

The present invention relates to a portable ray tracing technique and, more particularly, to a portable ray tracing apparatus which shares graphics processing by performing ray tracing by being physically connected to a computing device.

3D graphics technology is a technology used for three-dimensional representation of geometry data stored in a computing device and is widely used today for various industries including media and game industries. In general, 3D graphics technology requires a large amount of computations, which inevitably involves a high-performance graphic processor. Ray tracing technique is capable of simulating various optical effects such as reflection, refraction, and shadow and capable of producing photorealistic 3D graphic images.

The Korea registered patent No. 10-1560283 (2015, Oct. 7) relates to a 3D image building method, a 3D image building machine which performs the method, and a storage media which stores 3D images, the 3D image building method comprising (a) determining a method for partitioning a given space and partitioning the given space into a plurality of subspaces (each of which forms a k-d tree node) and (b) repeating the step (a) by considering each of the plurality of subspaces as the given space, wherein, if the corresponding subspace corresponds to an internal node of the k-d tree, the step (a) includes checking whether the number of raw data belonging to the internal node exceeds a threshold.

The Korea laid-open patent No. 10-2014-0023615 (2014, Feb. 27) relates to a ray search unit based on a tree acceleration structure. The ray search unit includes a plurality of sub-pipeline units, each of which processes a different task required for the ray search employing the tree acceleration structure and operates in parallel with each other.

PRIOR ART REFERENCES

Patent References

Korea registered patent No. 10-1560283 (2015, Oct. 7)
Korea laid-open patent No. 10-2014-0023615 (2014, Feb. 27)

SUMMARY

One embodiment of the present invention provides a portable ray tracing apparatus which shares graphics processing by performing ray tracing by being physically connected to a computing device.

One embodiment of the present invention provides a portable ray tracing apparatus capable of periodically sharing a second acceleration structure constructed from a ray tracing process through synchronization of an internal memory.

One embodiment of the present invention provides a portable ray tracing apparatus capable of performing synchronization with an external computing device if being connected thereto through a connection port and automatically supporting a graphics process of the corresponding computing device.

Among embodiments of the present invention, a portable ray tracing apparatus comprises a physical connection unit providing a physical connection to a connection port of a user terminal; a graphic data area detecting unit detecting a graphic data area which is allocated to a system memory of the user terminal if the physical connection is provided and which employs an acceleration structure for graphics processes agreed upon in advance; and a graphic processor operating unit synchronizing the graphic data area with an internal memory and operating a graphic processor of the user terminal.

The physical connection unit includes a physical connection detecting module detecting the physical connection and if the physical connection detecting module detects the physical connection, determines provision of the physical connection to initiate operation of the graphic data area detecting unit and the graphic processor operating unit.

If the degree of connection calculated based on the magnitude and the change rate of an electrical signal received from the connection port exceeds a threshold, the physical connection detecting module may finally determine the case as the physical connection.

The acceleration structure for graphics processes may include a first acceleration structure related to static objects and a second acceleration structure related to dynamic objects; and the graphic data area detecting unit may detect a memory area related to the second acceleration structure as the graphic data area.

The portable ray tracing apparatus may further include a ray tracing performing unit operating in conjunction with operation of the graphic processor and performing ray tracing based on an acceleration structure for graphics processes stored in the internal memory.

The ray tracing performing unit may perform synchronization between the internal memory and the system memory according to an update period determined based on performance of the graphic processor, performance of an input/output interface for the physical connection, and ray tracing processing performance.

The graphic processor operating unit may store the first acceleration structure stored in the graphic data area during the synchronization process to the internal memory; the graphic processor may update the dynamic object by performing Level Of Detail (LOD) operation for each frame; and the ray tracing performing unit may construct a second acceleration structure based on the dynamic object updated for each frame and store the constructed second acceleration structure in the internal memory.

The ray tracing performing unit may generate an image for each frame by performing a ray generation step, traversal & intersection test step, shading step, and texture mapping step; and provide the generated image to the user terminal.

The graphic processor may be operated by performing a 3D data loading step, scene management step, and acceleration structure generation step and deliver a result of the ray tracing to a display module.

DETAILED DESCRIPTION

Figure 1:
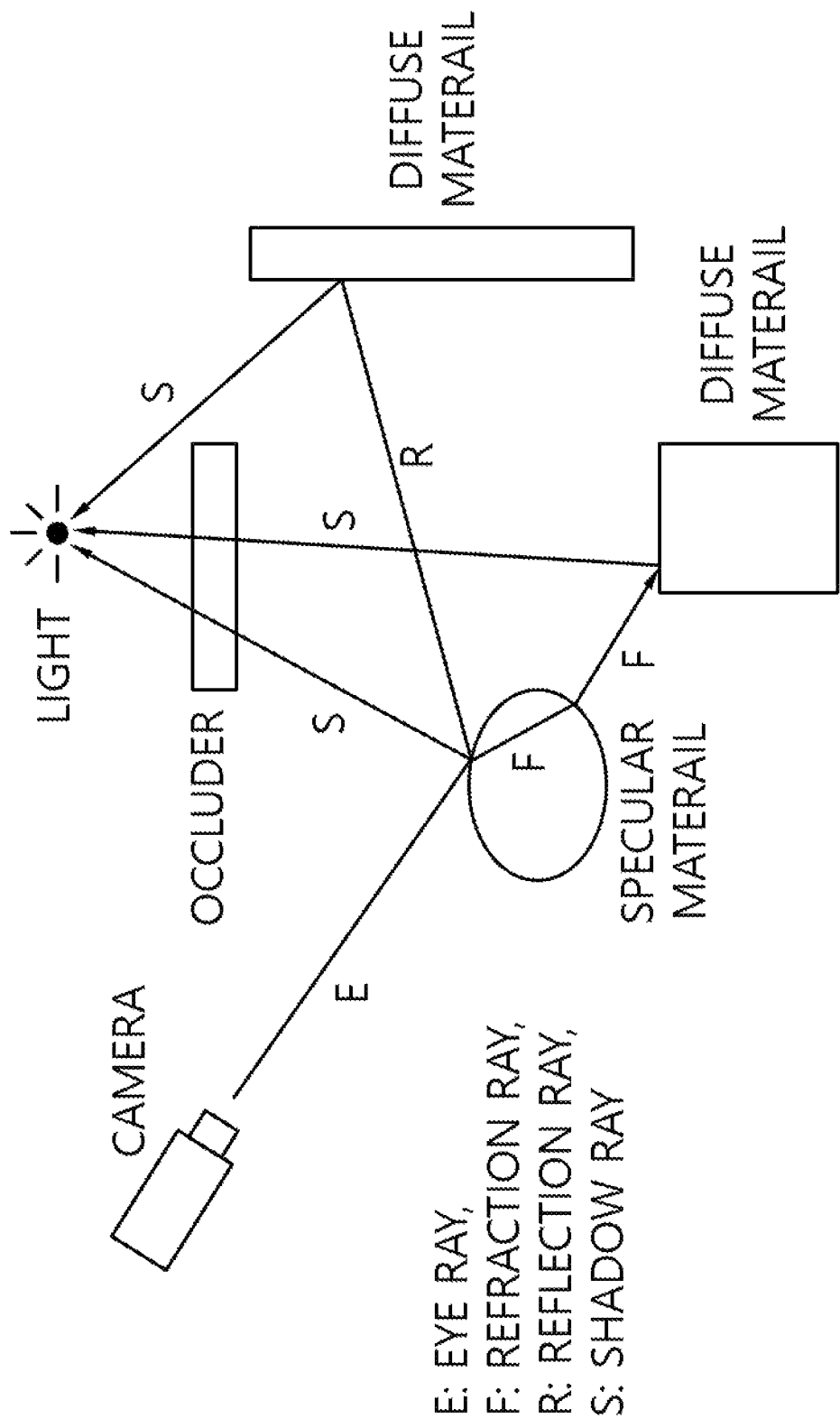
FIGS. 1 and 2 illustrate a ray tracing process performed in a portable ray tracing system according to one embodiment of the present invention.

Since description of the present invention is merely an embodiment for illustrating structural or functional description, it should not be interpreted that the technical scope of the present invention is limited by the embodiments described in this document. In other words, embodiments may be modified in various ways and implemented in various other forms; therefore, it should be understood that various equivalents realizing technical principles of the present invention belong to the technical scope of the present invention includes. Also, since it is not meant that a specific embodiment should support all of the purposes or effects intended by the present invention or include only the purposes or effects, the technical scope of the disclosed invention should be not regarded as being limited to the descriptions of the embodiment.

Meanwhile, implication of the terms used in this document should be understood as follows.

The terms such as "first" and "second" are introduced to distinguish one element from the others, and thus the technical scope of the present invention should not be limited by those terms. For example, a first element may be called a second element, and similarly, the second element may be called the first element.

If a constituting element is said to be "connected" to other constituting element, the former may be connected to the other element directly, but it should be understood that another constituting element may be present between the two elements. On the other hand, if a constituting element is said to be "directly connected" to other constituting element, it should be understood that there is no other constituting element present between the two elements. Meanwhile, other expressions describing a relationship between constituting elements, namely "between" and "right between" or "adjacent to" and "directly adjacent to" should be interpreted to provide the same implication.

A singular expression should be understood to indicate a plural expression unless otherwise explicitly stated. The term of "include" or "have" is used to indicate existence of an embodied feature, number, step, operation, constituting element, component, or a combination thereof; and should not be understood to preclude the existence or possibility of adding one or more other features, numbers, steps, operations, constituting elements, components, or a combination thereof.

Identification symbols (for example, a, b, and c) for individual steps are used for the convenience of description. The identification symbols are not intended to describe the operation order of the steps. Therefore, unless otherwise explicitly indicated in the context of description, the steps may be executed differently from the stated order. In other words, the respective steps may be performed in the same order as stated in the description, actually performed simultaneously, or performed in a reverse order.

The present invention may be implemented in the form of program codes in a computer-readable recording medium, where a computer-readable recording medium includes all kinds of recording apparatus which store data that may be read by a computer system. Examples of a computer-readable recording medium include ROM, RAN, CD-ROM, magnetic tape, floppy disk, and optical data storage device. Also, a computer-readable recording medium may be distributed may be distributed over computer systems connected to each other through a network so that computer-readable codes may be stored and executed in a distributed manner.

Unless defined otherwise, all of the terms used in this document provide the same meaning as understood generally by those skilled in the art to which the present invention belongs. Those terms defined in ordinary dictionaries should be interpreted to have the same meaning as conveyed by a related technology in the context. And unless otherwise defined explicitly in the present invention, those terms should not be interpreted to have ideal or excessively formal meaning.

Figure 2:
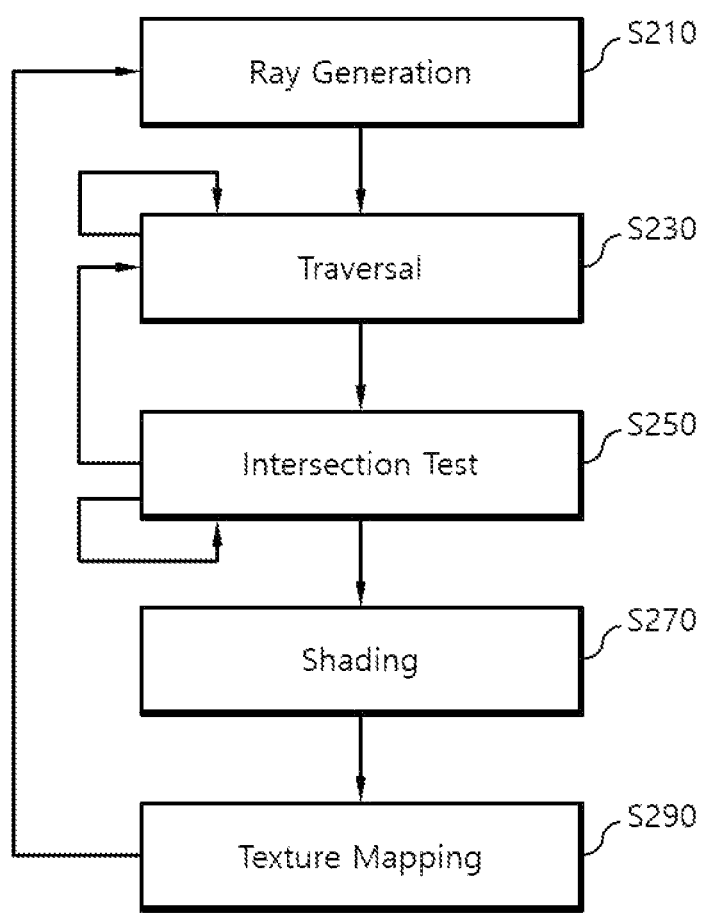

FIGS. 1 and 2 illustrate a ray tracing process performed in a portable ray tracing system according to one embodiment of the present invention.

Referring to FIG. 1, an eye ray (E) is generated at the camera position for each pixel, and calculations are carried out to find an object hit by the ray (E). If the object hit by the corresponding ray (E) is a specular material which refracts the ray or a diffuse material which reflects the ray, a refraction ray (F) simulating the refraction effect and/or a reflection ray (R) simulating the reflection effect is generated at the point the corresponding ray (E) meets the object, and a shadow ray (S) may be generated in the direction of light. In one embodiment, if a shadow ray (S) hits another object (occluder), a shadow may be generated at the point where the corresponding shadow ray (S) has been generated.

Referring to FIG. 2, the ray tracing process may be performed recursively and may include (i) eye ray generation step S210, (ii) acceleration structure (AS) traversal step S230, (iii) intersection test step S250, (iv) shading step S270, and (v) texture mapping step S290.

The eye ray generation step S210 may generate at least one ray based on eye ray generation information and shading information. Eye ray generation information may include screen coordinates for generating an eye ray, and shading information may include a ray index for obtaining screen coordinates, coordinates of a ray-triangle hit point, color value, and shading ray type. Also, shading information may further include additional information according to the shading ray type.

Here, a shading ray may include a shadow ray (S), secondary ray or NULL ray; and the secondary ray may include a refraction ray (F) and/or reflection ray (R). The refraction ray (F) may include the refractive index of a ray-triangle hit point as additional information, and the reflection ray (R) may include reflectance of the ray-triangle hit point as additional information.

The acceleration structure traversal step S230 may find a leaf node which intersects a ray by searching nodes based on the acceleration structure. Here, the acceleration structure may correspond to a k-d tree, and the traversal process of the acceleration structure may correspond to recursion of the k-d tree.

The intersection test step S250 may correspond to a ray-triangle intersection test, which may read a triangle list belonging to a leaf node intersecting a ray and perform an intersection test against a given ray based on the coordinates of the corresponding triangle list. The shading step S270 may calculate the color value of a ray-triangle hit point and deliver shading information including the coordinates, color value, and shading ray type of the ray-triangle hit point to the next step. The texture mapping step S290 may generate an image for a current frame through texture mapping.

Since an image of a current frame may include both of a static and dynamic objects in the ray tracing process, the ray-triangle intersection test may be performed for each of the first and the second acceleration structures, and ray tracing may be performed based on the acceleration structure where ray meets triangles in the first or second acceleration structure. During the ray tracing process, if the ray intersects a triangle in both of the first and the second acceleration structure, an acceleration structure for ray tracing may be determined based on the viewpoint of the ray and distances of the respective triangles hit by the ray.

In other words, since a triangle at a short distance may correspond to an object located close to the viewer, a triangle yielding a short distance among the respective distances of the triangles which intersect the viewpoint of the ray may be selected. For example, suppose the distance between the eye viewpoint and an intersecting triangle of the first acceleration structure is S1, and the distance between the eye viewpoint and an intersecting triangle of the second acceleration structure is S2. If S1 is shorter than S2, ray tracing may be performed based on the triangle intersecting the first acceleration structure while, if S2 is shorter than S1, ray tracing may be performed based on the triangle intersecting the second acceleration structure.

Figure 3:
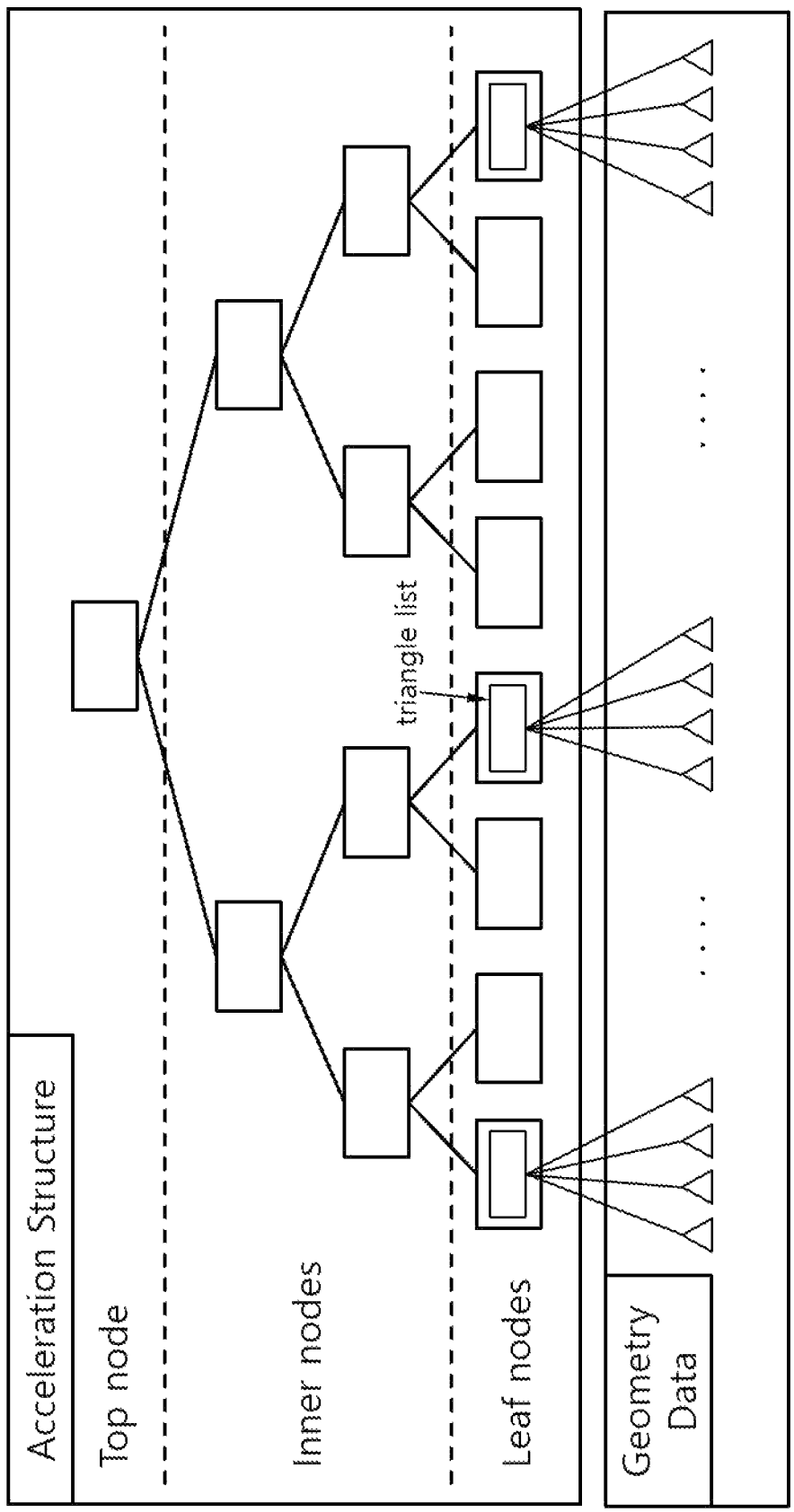
FIG. 3 illustrates an acceleration structure and geometry data used in a ray tracing process.

FIG. 3 illustrates an acceleration structure and geometry data used in a ray tracing process.

Referring to FIG. 3, the acceleration structure (AS) may include a k-d tree (k-depth tree) or bounding volume hierarchy (BVH) commonly used for ray tracing. FIG. 3 illustrates an acceleration structure based on a k-d tree.

A k-d tree is one of spatial partitioning tree structures, which may be used for the ray-triangle intersection test. A k-d tree may include a top node, inner nodes, and leaf nodes, where a leaf node may include a triangle list for pointing at least one triangle included in the geometry data. In one embodiment, if triangle information included in the geometry data is implemented in the form of an array, the triangle list included in the leaf node may correspond to an array index.

Figure 4:
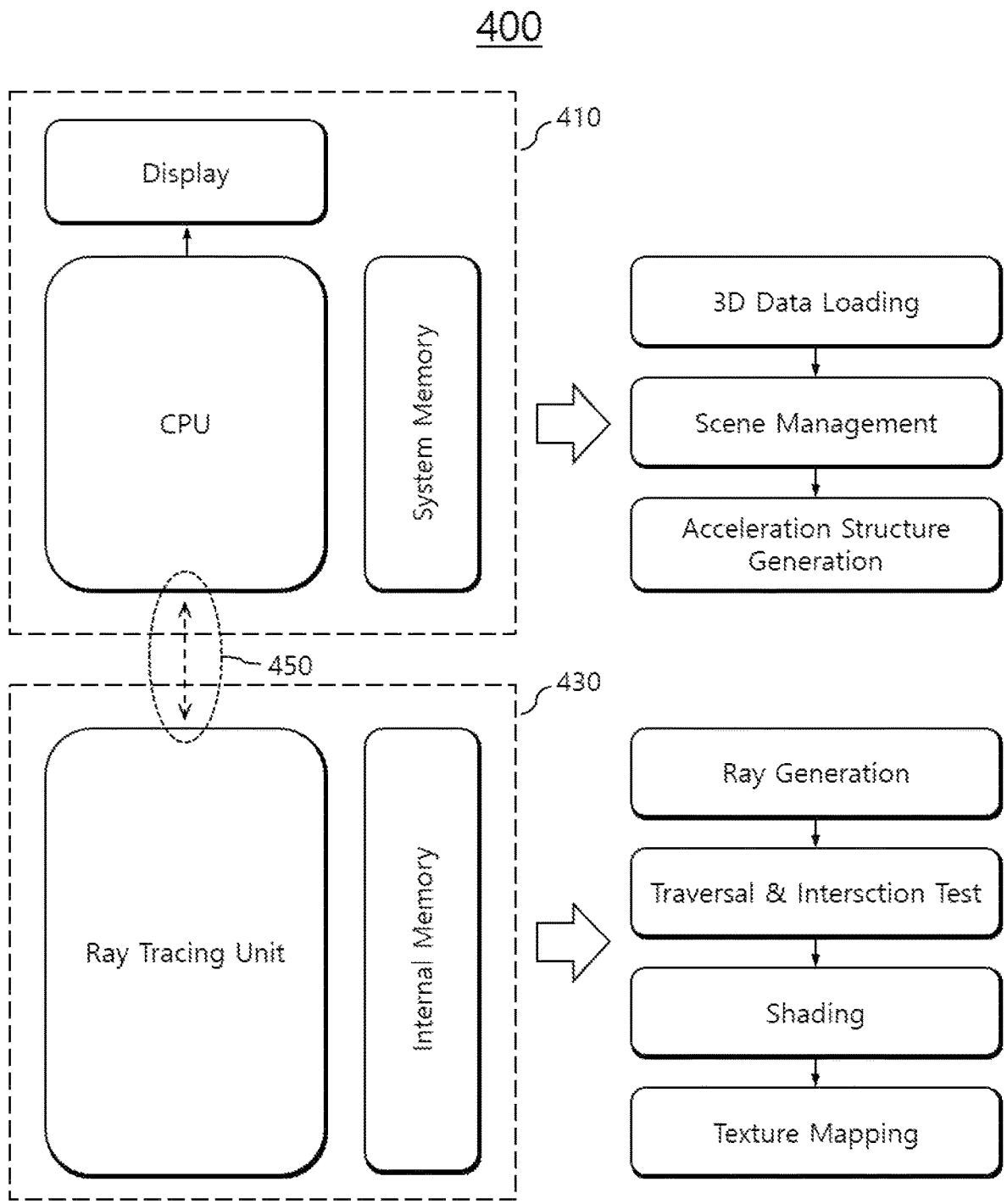
FIG. 4 illustrates a portable ray tracing system according to one embodiment of the present invention.

FIG. 4 illustrates a portable ray tracing system according to one embodiment of the present invention.

Referring to FIG. 4, a portable ray tracing system 400 may include a user terminal 410 and portable ray tracing apparatus 430. The user terminal 410 and the portable ray tracing apparatus 430 may be physically connected to each other through a connection port attached to each of them.

In one embodiment, the input/output interface 450 used for physical connection of the user terminal 410 and the portable ray tracing apparatus 430 may correspond to thunderbolt 3. Thunderbolt is one of input/output interfaces used for connecting a computing device and peripheral devices with each other, which includes PCI express (PCIe) and display ports. In one embodiment, the input/output interface 450 may be implemented by being included in the portable ray tracing apparatus 430.

The user terminal 410 may correspond to a computing device capable of graphics processing and may be implemented by a smartphone, notebook, or computer; however, the user terminal is not necessarily limited to the aforementioned examples and may be implemented by various devices such as a tablet PC. The user terminal 410 may be implemented by including a connection port therein for connecting physically to the portable ray tracing apparatus 430, which may correspond to the USB type-c port. The user terminal 410 may be implemented by including a central processing unit (CPU), display module, and system memory. Here, the central processing unit may correspond to a graphic processor capable of graphics processing and may perform graphics processes in conjunction with the system memory and display module.

In one embodiment, the graphic processor may update a dynamic object by performing Level Of Detail (LOD) operation for each frame. The LOD operation may include reduction of complexity of representing 3D objects when an object moves away from a viewer or according to different criteria such as object importance, eye-space speed or position and may provide efficient ray tracing by taking into account the distance from the viewer. More specifically, the graphic processor may perform LOD operation based on the data about a dynamic object among geometry data stored in the system memory and generate a new dynamic object, which may be performed repeatedly in the ray tracing process.

In one embodiment, the graphic processor may be operated by performing a 3D data loading step, scene management step, and acceleration structure generation step; and may deliver the ray tracing result to the display module. Here, the ray tracing result may be received in real-time or periodically through the input/output interface 450 from the portable ray tracing apparatus 430, and the display module may reproduce an image based on the received data.

The 3D data loading step may receive geometry data from an external storage device and store the received geometry data to the system memory or store the geometry data received through a network to the system memory. The scene management step may generate and/or update a static scene and dynamic scene based on the geometry data. The acceleration structure generation step may generate an acceleration structure related to a static object comprising a static scene and a dynamic object comprising a dynamic scene.

The portable ray tracing apparatus 430 may correspond to a device which is physically connected to the user terminal 410 and is capable of supporting graphics processing of the user terminal 410. The portable ray tracing apparatus 430 may include a connection port for physically connecting the portable ray tracing apparatus 430 to the user terminal 410. The portable ray tracing apparatus 430 may be implemented by including a ray tracing unit performing ray tracing and an internal memory. Here, the ray tracing unit may correspond to a graphic processor which performs ray tracing. Also, the portable ray tracking apparatus 430 may receive power for ray tracing from the user terminal 410.

Figure 5:
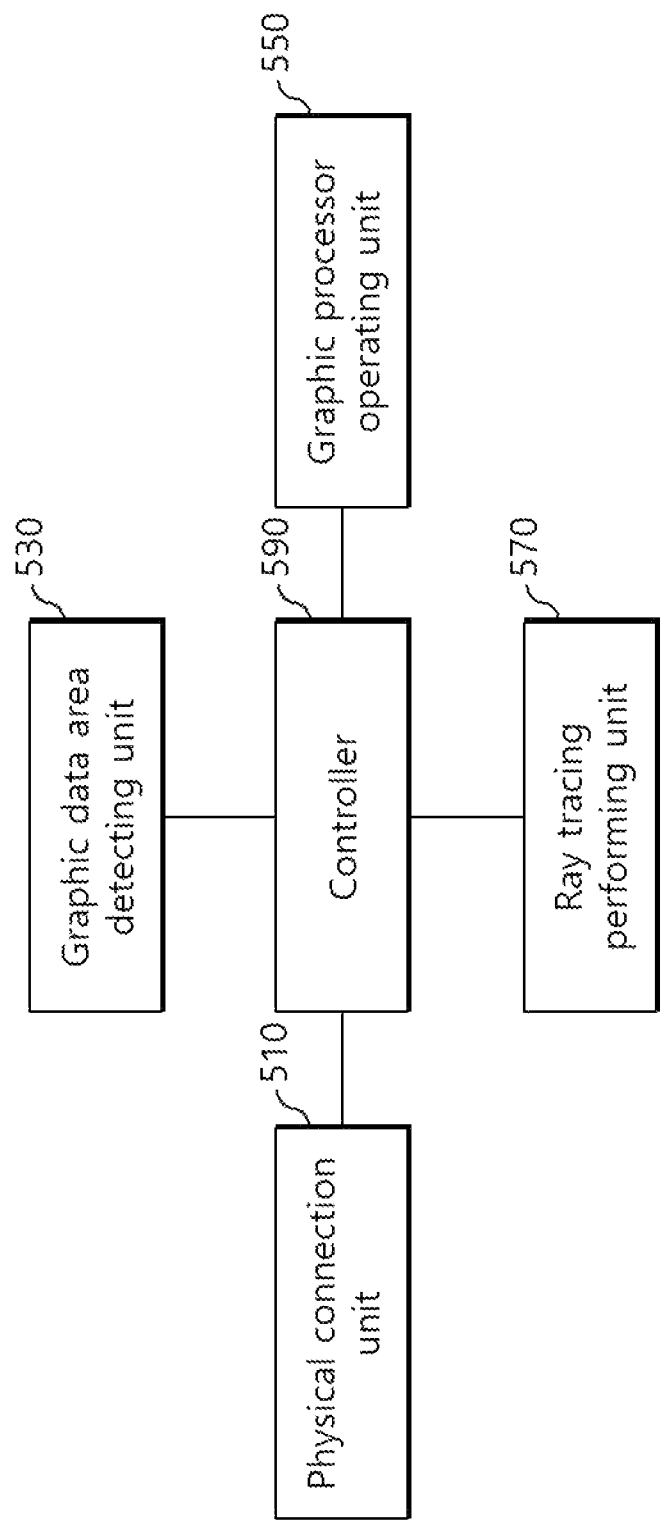
FIG. 5 illustrates a functional structure of the portable ray tracing apparatus of FIG. 4.

FIG. 5 illustrates a functional structure of the portable ray tracing apparatus of FIG. 4.

Referring to FIG. 5, the portable ray tracing apparatus 430 may include a physical connection unit 510, graphic data area detecting unit 530, graphic processor operating unit 550, ray tracing performing unit 570, and controller 590.

The physical connection unit 510 may provide a physical connection to the connection port of the user terminal 410. The portable ray tracing apparatus 430, being physically connected to the user terminal 410, may perform a graphics processing operation. Also, the portable ray tracing apparatus 430 may automatically detect whether it is physically connected to the user terminal 410, and the user may easily use a function for graphics processing by using a simple operation of connecting the portable ray tracing apparatus 430 to the user terminal 410. In one embodiment, the physical connection unit 510 may be implemented by including the input/output interface 450 and in this case, may provide a physical connection between the user terminal 410 and the ray tracing apparatus 430 through the input/output interface 450.

In one embodiment, the physical connection unit 510 may include a physical connection detecting module which detects a physical connection and when a physical connection is detected between the user terminal 410 and the portable ray tracing apparatus 430 by the physical connection detecting module, determines to provide a physical connection and initiates the operation of the graphic data area detecting unit 530 and graphic processor operating unit 550. The physical connection unit 510 may not perform synchronization for graphics processing in the case of a temporary contact or a short-term connection even if a physical connection is detected.

To this end, when a physical connection is detected, the physical connection unit 510 checks if the physical connection lasts for more than a predetermined time period to determine whether to provide a physical connection and initiates the operation of the next step for graphics processing only when provision of the physical connection is determined, thereby providing reliable graphics processing.

In one embodiment, if the degree of connection calculated based on the magnitude and the change rate of an electrical signal received from the connection port exceeds a threshold, the physical connection detecting module may finally determine the case as a physical connection. At this time, when the physical connection detecting module detects a physical connection, the physical connection unit 510 may omit determining whether to provide a physical connection.

More specifically, the physical connection detecting module may measure the magnitude and periodic change rate of an electrical signal received from the user terminal due to a physical connection and calculate the degree of connection through the measurement. The degree of connection is a numerical number representing rigidity of a connection, which may be high as the magnitude of the electrical signal is large and change rate thereof is small. The physical connection detecting module may compare the degree of connection with a threshold and if the degree of connection exceeds the threshold, may finally determine that a physical connection has been detected.

Also, the physical connection detecting module may utilize an equation for calculating the degree of connection and may use the magnitude and change rate of an electrical signal as variables. The physical connection detecting module may normalize the value calculated by the equation within a predetermined range, thereby increasing efficiency of detecting a physical connection.

If a physical connection is provided, the graphic data area detecting unit 530 is allocated to the system memory of the user terminal 410 and may detect a graphic data area including an acceleration structure for graphics processing agreed upon in advance. In other words, the graphic data area may correspond to part of the system memory of the user terminal 410 and may be allocated to a specific area of the system memory according to the rule for graphics processing agreed upon in advance. Here, the specific area is a logical area of the system memory, which may be accessed only through a limited access right and may have a fixed size.

When a physical connection is provided, the graphic data area detecting unit 530 may detect a specific area of the system memory as a graphic data area through the graphic processor of the user terminal 410, and when the physical connection is removed, the graphic data area may be initialized. In one embodiment, when the physical connection of the portable ray tracing apparatus 430 is released, the graphic processor may maintain the graphic data area for a specific time period and when a physical connection is performed again within a specific time period, may promptly provide synchronization of the graphic data area.

In one embodiment, the graphic data area detecting unit 530 may detect a memory area related to a second acceleration structure as a graphic data area. In this case, the acceleration structure for graphics processing may include a first acceleration structure for static objects and a second acceleration structure for dynamic objects. In other words, the graphic data area detecting unit 530 may detect only the memory area for the second acceleration structure for dynamic objects as the graphic data area, thereby strengthening security against other memory areas.

The graphic processor operating unit 550 may synchronize a graphic data area with an internal memory and operate the graphic processor of the user terminal 410. When the system memory is synchronized with the internal memory due to a physical connection, the user terminal 410 and the portable ray tracing apparatus 430 may divide and take charge of operations for graphics processing.

In other words, the graphic processor of the user terminal 410 may provide the ray tracing apparatus 430 with data for ray tracing, receive an image for each frame from the ray tracing apparatus 430 as a result of ray tracing, and reproduce the image through a display module. On the contrary to the operation above, the portable ray tracing apparatus 430 may receive data for ray tracing from the user terminal 410, perform ray tracing, and as a result of performing ray tracing, provide the user terminal 410 with an image for each frame.

The ray tracing performing unit 570 may be linked to the operation of the graphic processor and perform ray tracing based on the acceleration structure for graphics processing stored in the internal memory. The ray tracing performing unit 570 may transmit and receive a message to and from the graphic processor for the operation in conjunction with the graphic processor. The graphic processor of the user terminal 410 may construct a first acceleration structure for static objects, update dynamic objects for each frame, and provide an update completion message when update of a dynamic object is completed. When an update completion message of a dynamic object is received from the user terminal 410, the ray tracing performing unit 570 may perform ray tracing based on the acceleration structure for graphics processing of the internal memory synchronized with a graphic data area.

In one embodiment, the ray tracing performing unit 570 may perform synchronization between the internal memory and system memory according to an update period determined based on performance of the graphic processor, performance of an input/output interface for a physical connection, and ray tracing processing performance. In other words, instead of synchronizing a second acceleration structure constructed based on dynamic objects for each frame, the ray tracing performing unit 570 may reduce the load due to synchronization by performing synchronization at specific frame intervals according to the update period.

The update period may be defined by a frame interval; for example, when the update period is 7, synchronization may be performed at 7 frame intervals. As a variable for determining the update period, processing capability of the graphic processor, communication capability of the input/output interface, and processing speed of ray tracing may be utilized. The better the processing capability of the graphic processor, the better the communication capability of the input/output interface, and the faster the processing speed of ray tracing, the shorter the update period.

In one embodiment, the ray tracing performing unit 570 may construct a second acceleration structure based on dynamic objects updated for each frame by the graphic processor of the user terminal 410 and store the second acceleration structure in the internal memory. In this case, the graphic processor of the user terminal 410 may update the dynamic object by performing Level Of Detail (LOD) operation for each frame, and the graphic processor operating unit 550 may store beforehand a first acceleration structure stored in the graphic data area during a synchronization process in the internal memory.

Since it is essential to update information about dynamic objects in order to generate an image for each frame, the second acceleration structure may be constructed repeatedly each time the information about dynamic objects is changed. In order to distribute graphics processing which requires a large amount of computations, update of dynamic objects and construction of the second acceleration structure may be performed by being divided respectively between the graphic processor of the user terminal 410 and the ray tracing performing unit 570 of the portable ray tracing apparatus 430.

In one embodiment, the ray tracing performing unit 570 may generate an image for each frame by performing a ray generation step, traversal & intersection test step, shading step, and texture mapping step; and provide the generated image to the user terminal 410. In other words, after constructing the second acceleration structure based on dynamic objects updated by the graphic processor of the user terminal 410, the ray tracing performing unit 570 may generate an image for a current frame by performing a ray tracing process comprising a series of processing steps and deliver the generated image to the user terminal 410 through the input/output interface 450.

In one embodiment, the ray tracing performing unit 570 may store an image for each frame in a frame buffer allocated in the internal memory and reduce the burden due to transmission of an image for each frame by delivering the image stored in the frame buffer to the user terminal 410 simultaneously at the time of synchronization according to an update period.

The controller 590 may control the overall operation of the portable ray tracing apparatus 430 and manage a control flow or a data flow among the physical connection unit 510, graphic data area detecting unit 530, graphic processor operating unit 550, and ray tracing performing unit 570.

Figure 6:
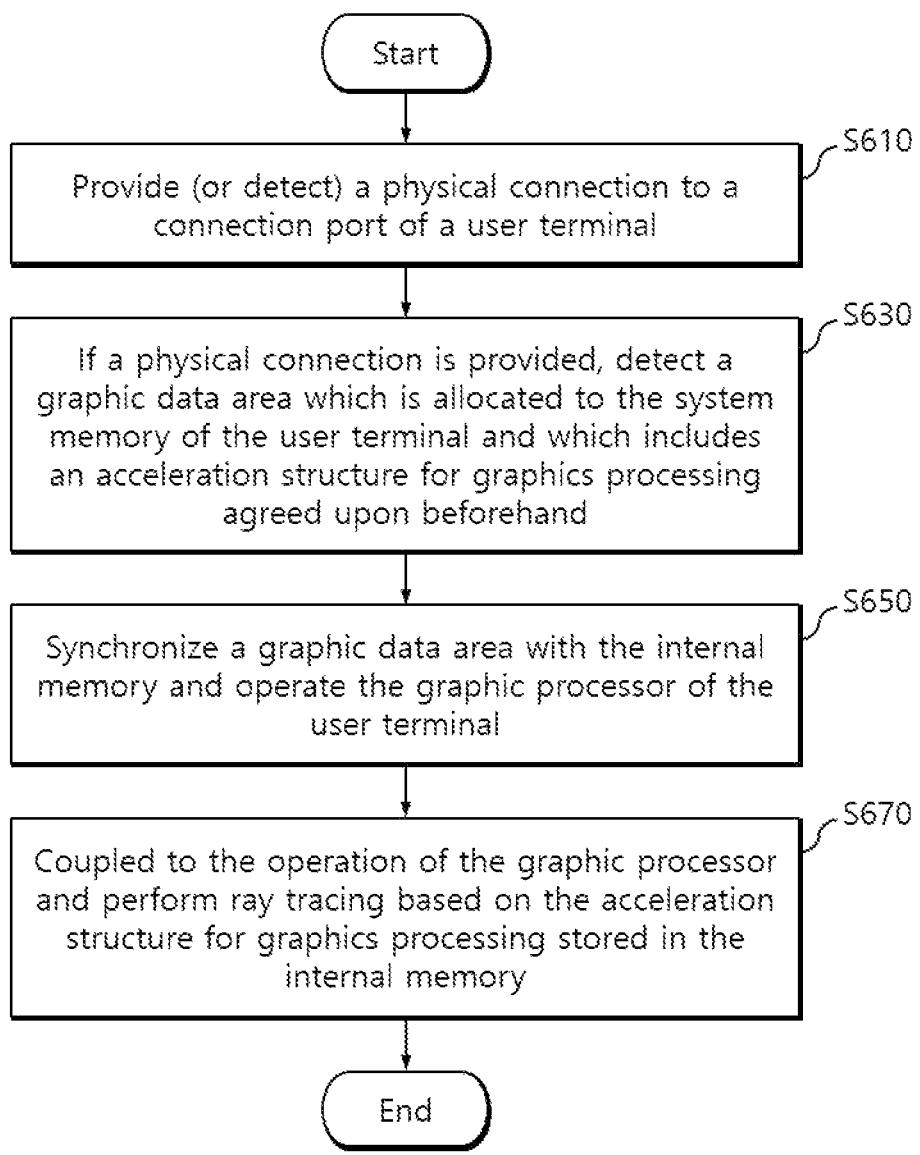
FIG. 6 is a flow diagram illustrating a portable ray tracing process performed in the portable ray tracing apparatus of FIG. 4.

FIG. 6 is a flow diagram illustrating a portable ray tracing process performed in the portable ray tracing apparatus of FIG. 4.

Referring to FIG. 6, the portable ray tracing apparatus 430 may provide (or detect) a physical connection to a connection port of the user terminal 410 through the physical connection unit 510, S610. If a physical connection is provided by the physical connection unit 510, the portable ray tracing apparatus 430 may detect a graphic data area which is allocated to the system memory of the user terminal 410 through the graphic data area detecting unit 530 and which includes an acceleration structure for graphics processing agreed upon beforehand S630.

The portable ray tracing apparatus 430 may synchronize a graphic data area with the internal memory through the graphics processing operating unit 550 and operate the graphic processor of the user terminal 410, S650. In one embodiment, if the portable ray tracing apparatus 430 fails to operate in conjunction with the graphic processor of the user terminal 410, the portable ray tracing apparatus 430 may process graphics processing in conjunction with the central processing unit of the user terminal. In one embodiment, if the graphic processor is not detected in the user terminal 410, the portable ray tracing apparatus 430 may stop synchronization with the user terminal 410. The portable ray tracing apparatus 430 may be coupled to the operation of the graphic processor through the ray tracing performing unit 570 and perform ray tracing based on the acceleration structure for graphics processing stored in the internal memory S670.

Figure 7:
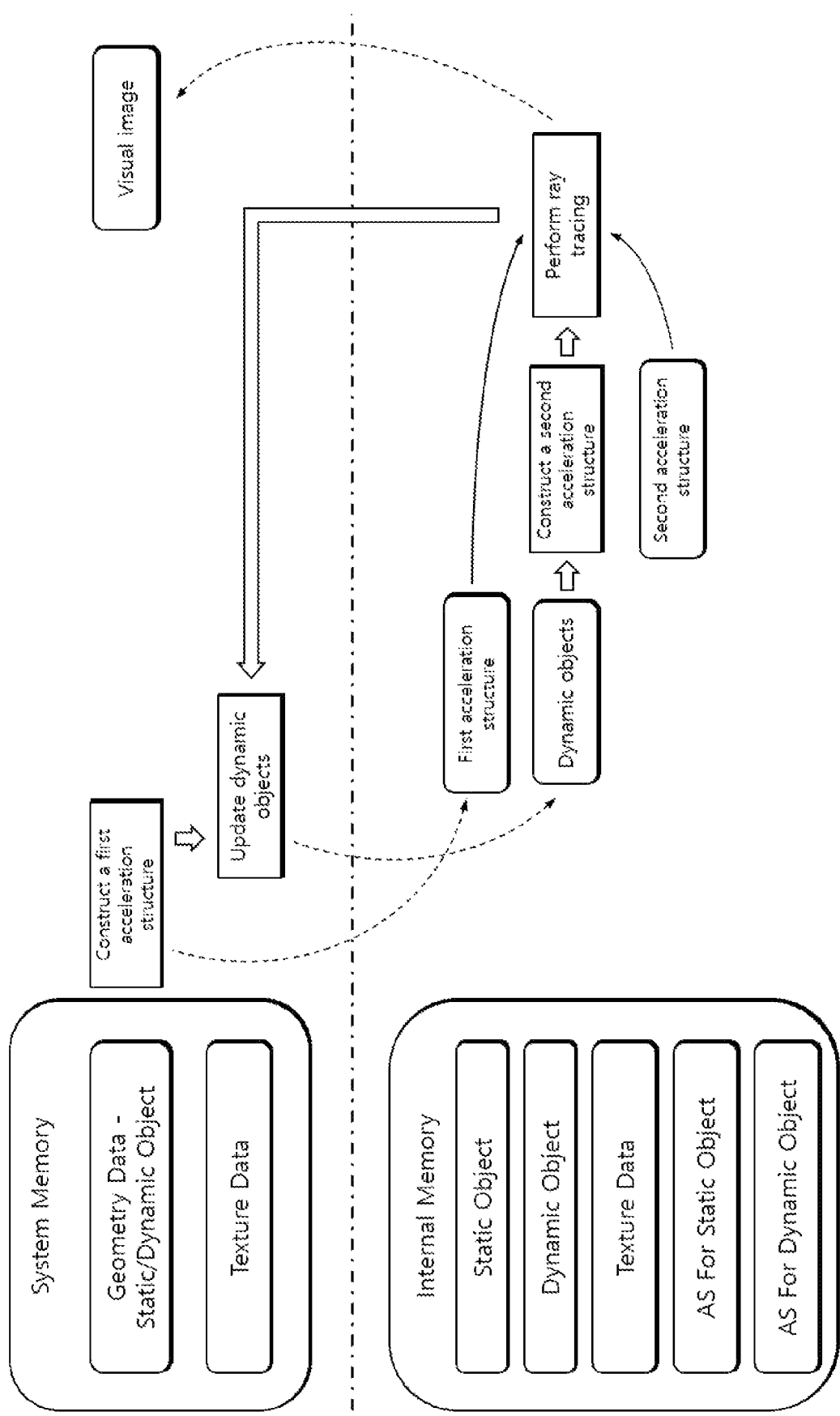
FIG. 7 illustrates operations performed in conjunction with each other during a portable ray tracing process according to one embodiment of the present invention.

FIG. 7 illustrates operations performed in conjunction with each other during a portable ray tracing process according to one embodiment of the present invention.

Referring to FIG. 7, the user terminal 410 may include a system memory, and the portable ray tracing apparatus 430 may include an internal memory. The system memory may store geometry data and texture data about static and dynamic objects comprising a 3D scene, and the internal memory may store static objects, dynamic objects, texture data, and first and second acceleration structures, separately. However, the present invention is not necessarily limited to the storage method and structure described above; various storage methods and structures may be used according to operating environments interworking with each other.

The user terminal 410 may perform construction of the first acceleration structure and update of dynamic objects through the graphic processor; the portable ray tracing apparatus 430 may perform construction of the second acceleration structure and ray tracing through the ray tracing performing unit 570; and the user terminal 410 and the portable ray tracing apparatus 430 may repeat the process above by being synchronized with each other for each frame. Ray tracing may be performed through a series of processes based on the first acceleration structure related to static objects and the second acceleration structure related to dynamic objects, where the second acceleration structure may be constructed repeatedly as dynamic objects are updated during the ray tracing process.

Also, the user terminal 410 may receive an image for each frame corresponding to a ray tracing result from the portable ray tracing apparatus 430 and reproduce the received image through a display module. In one embodiment, an image generated through ray tracing may be provided to the user terminal 410 periodically from the portable ray tracing apparatus 430 at specific frame intervals. In this case, the portable ray tracing apparatus 430 may include a frame buffer on the internal memory.

Figure 8:
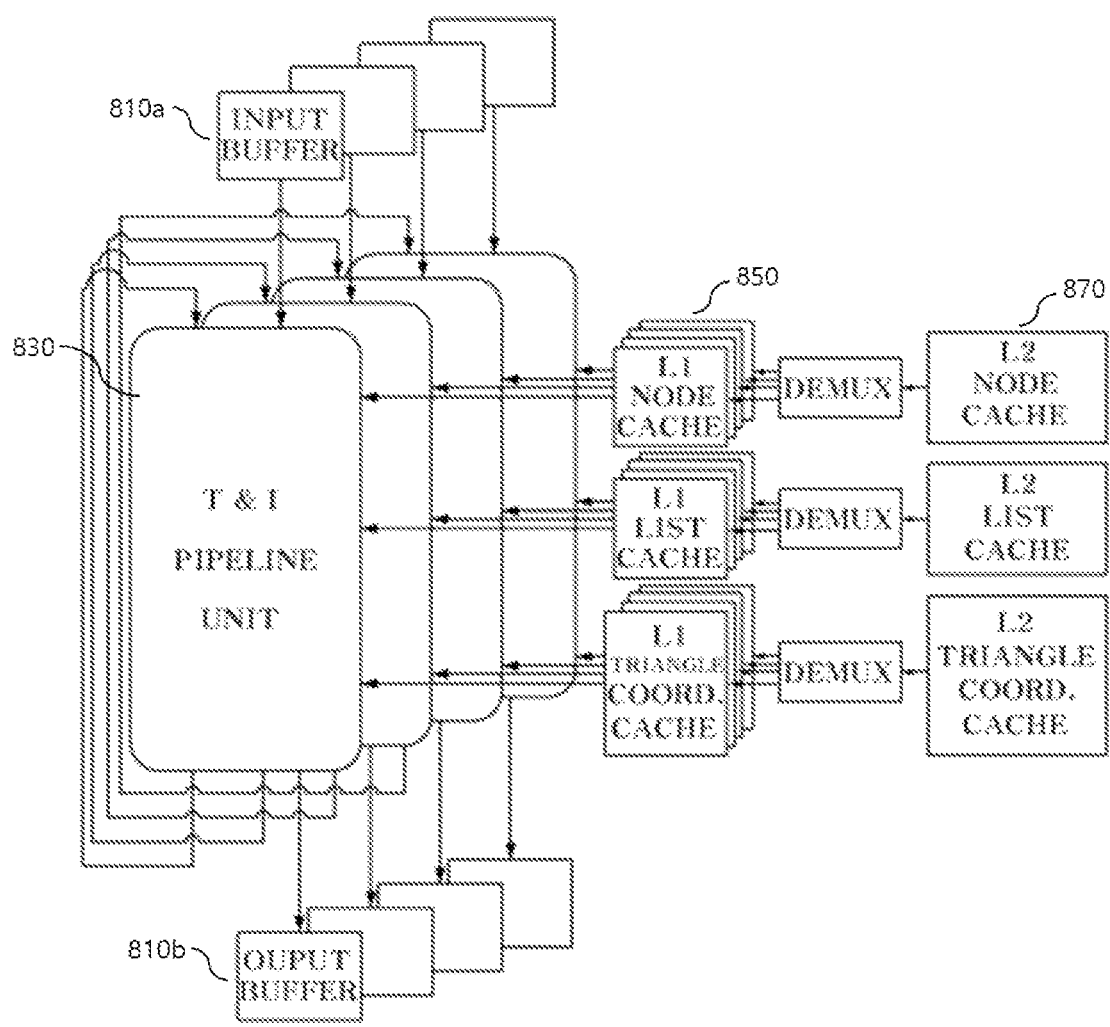
FIG. 8 illustrates MIMD architecture implemented in a ray tracing apparatus.

FIG. 8 illustrates MIMD architecture implemented in a ray tracing apparatus.

Referring to FIG. 8, the portable ray tracing apparatus 430 may include a plurality of T&I pipeline units 830, and each of the plurality of T&I pipeline units 830 may include a buffer 810, L1 cache 850, and L2 cache 870.

The portable ray tracing apparatus 430 may adopt an MIMD parallel structure where a plurality of T&I pipeline units 830 are executed independently from each other. The ray tracing process may treat each ray independently by taking advantage of the MIMD parallel structure, where the MIMD parallel structure provides an advantage compared with the Single Instruction Multiple Data (SIMD) structure that pipelines may be utilized more efficiently.

Since it is preferable that rays (eye ray and shading ray) generated from the same pixel are processed in the same T&D pipeline unit 830, each of the plurality of T&I pipeline units 830 may include its own input buffer 810*a* and output buffer 810*b*. Also, since the MIMD structure requires an efficient cache memory, each of the plurality of T&I pipeline units 830 may include its own L1 cache 850. The portable ray tracing apparatus 430 may provide ray tracing efficiently and operate in conjunction with an external computing device to support graphics processing of the corresponding computing device effectively.

Although the present invention has been described with reference to preferred embodiments given above, it should be understood by those skilled in the art that various modifications and variations of the present invention may be made without departing from the technical principles and scope specified by the appended claims below.

The disclosed invention may provide the following effects. However, since it is not meant that a specific embodiment has to provide all of the following effects or only the effects, the technical scope of the disclosed invention should not be regarded as being limited by the specific embodiment.

A portable ray tracing apparatus according to one embodiment of the present invention may periodically share a second acceleration structure constructed from a ray tracing process through synchronization of an internal memory.

A portable ray tracing apparatus according to one embodiment of the present invention may perform synchronization with an external computing device if being connected thereto through a connection port and automatically support a graphics process of the corresponding computing device.

What is claimed is:

1. A portable ray tracing apparatus comprising:
   a physical connection unit providing a physical connection to a connection port of a user terminal;
   a graphic data area detecting unit detecting a graphic data area which is allocated to a system memory of the user terminal if the physical connection is provided and which employs an acceleration structure for graphics processes agreed upon in advance;
   a graphic processor operating unit synchronizing the graphic data area with an internal memory and operating a graphic processor of the user terminal; and
   a ray tracing performing unit operating in conjunction with the graphic processor and performing ray tracing based on the acceleration structure for graphics processes stored in the internal memory,
   wherein the graphic data area detecting unit, the graphic processor operating unit, and the ray tracing performing unit are each implemented via at least one processor.

2. The portable ray tracing apparatus of claim 1, wherein the physical connection unit includes a physical connection detecting module detecting the physical connection, and determining a degree of the physical connection to initiate operation of the graphic data area detecting unit and the graphic processor operating unit, based on the physical connection detecting module detecting the physical connection.

3. The portable ray tracing apparatus of claim 2, wherein the degree of the physical connection is calculated based on a magnitude and a change rate of an electrical signal received from the connection port, and the physical connection detecting module finally determines that the physical connection has been detected, based on the degree of the physical connection exceeding a threshold.

4. The portable ray tracing apparatus of claim 1, wherein the acceleration structure for graphics processes includes a first acceleration structure related to static objects and a second acceleration structure related to dynamic objects; and the graphic data area detecting unit detects a memory area related to the second acceleration structure as the graphic data area.

5. The portable ray tracing apparatus of claim 1, wherein the ray tracing performing unit performs synchronization between the internal memory and the system memory according to an update period determined based on performance of the graphic processor, performance of an input/output interface for the physical connection, and ray tracing processing performance.

6. The portable ray tracing apparatus of claim 4, wherein the graphic processor operating unit stores the first acceleration structure stored in the graphic data area during the synchronization process to the internal memory the graphic processor updates the dynamic objects by performing Level Of Detail (LOD) operation for each frame, and the ray tracing performing unit constructs a second acceleration structure based on the dynamic objects updated for each frame and store the constructed second acceleration structure in the internal memory.

7. The portable ray tracing apparatus of claim 1, wherein the ray tracing performing unit generates an image for each frame by performing ray generation, traversal and intersection testing, shading, and texture mapping, and provides the generated image to the user terminal.

8. The portable ray tracing apparatus of claim 1, wherein the graphic processor is operated by performing 3D data loading, scene management, and acceleration structure generation, and delivers a result of the ray tracing to a display module.

* * * * *